United States Patent [19]

Nugent

[11] Patent Number: 5,168,749
[45] Date of Patent: Dec. 8, 1992

[54] APPARATUS AND METHODS FOR DETERMINING BALANCE OF A CYLINDRICAL VEHICLE

[75] Inventor: David M. Nugent, Newport, R.I.

[73] Assignee: The United States of America as represented by the Secretary of the Navy, Washington, D.C.

[21] Appl. No.: 750,998

[22] Filed: Aug. 28, 1991

[51] Int. Cl.$^5$ .............................................. G01M 1/12
[52] U.S. Cl. ......................................................... 73/65
[58] Field of Search ............................................. 73/65

[56] References Cited

U.S. PATENT DOCUMENTS 3,225,590 12/1965 Ward et al. ................................ 73/65
3,320,794 5/1967 Monroe et al. ........................... 73/65

FOREIGN PATENT DOCUMENTS 0149534 6/1988 Japan ........................................ 73/65
0615373 7/1978 U.S.S.R. .................................. 73/65
0875226 10/1981 U.S.S.R. .................................. 73/65

Primary Examiner—Herbert Goldstein
Assistant Examiner—Elizabeth L. Shopbell
Attorney, Agent, or Firm—Michael J. McGowan; Prithvi C. Lall; Michael F. Oglo

[57] ABSTRACT

Apparatus and methods for determining balance of a cylindrical vehicle, the apparatus comprising a frame adapted for horizontal disposition, first and second support assemblies mounted on the frame for receiving the vehicle, first and second load cells mounted, respectively, on the first and second support assemblies, whereby upon placement of the vehicle on the support assemblies the load cells are adapted to provide readings indicative of the weight of the vehicle, from which may be determined the center of gravity of the vehicle. A torsion cell assembly is mounted on the frame and adapted for connection to the vehicle and for providing indications of righting moment and static heel of the vehicle.

22 Claims, 5 Drawing Sheets

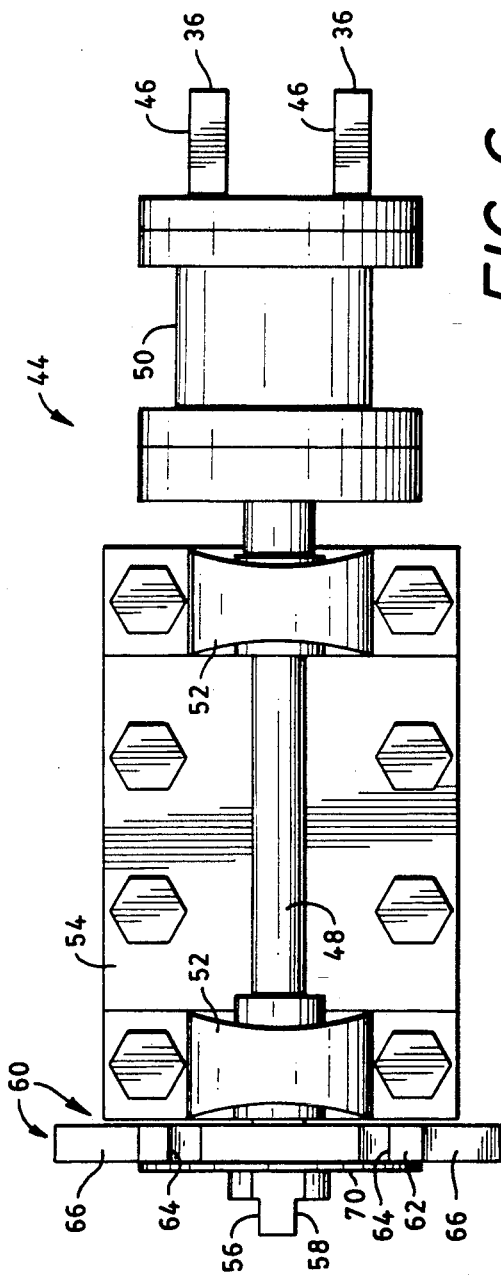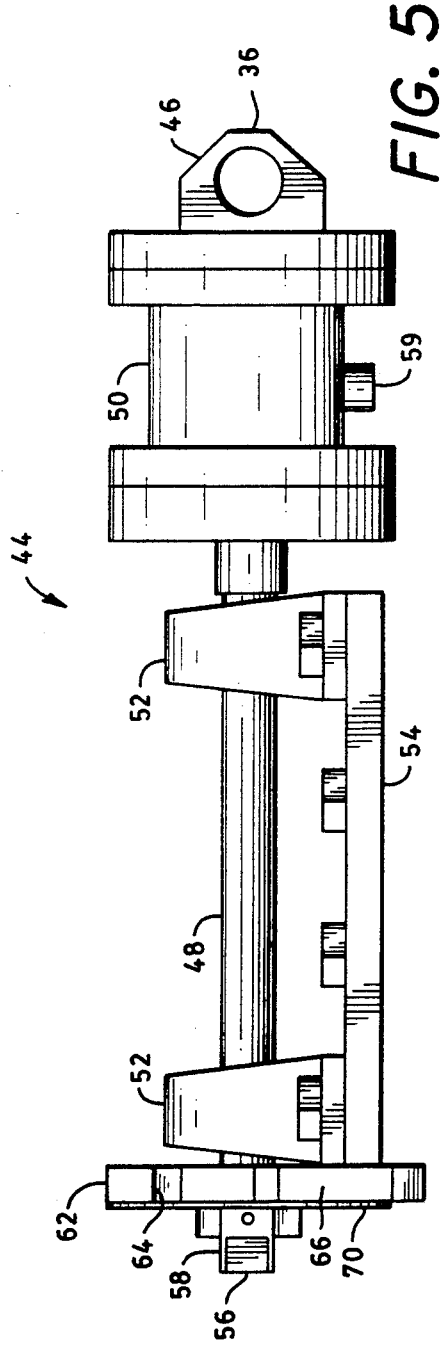

APPARATUS AND METHODS FOR DETERMINING BALANCE OF A CYLINDRICAL VEHICLE

STATEMENT OF GOVERNMENT INTEREST

The invention described herein may be manufactured and used by or for the Government of the United States of America for government purposes without the payment of any royalties thereon or therefor.

BACKGROUND OF THE INVENTION

1. Field of the Invention

The invention relates to measuring devices and methods and is directed more particularly to measurement of parameters necessary for guidance systems of torpedoes, acoustic targets, and other generally cylindrically-shaped water-borne missiles/vehicles.

2. Description of the Prior Art

For the operation of guidance systems for cylindrically shaped vehicles, such as torpedoes, acoustic targets, and other water-borne vehicles, it is necessary that certain fundamental parameters of the vehicle be known and incorporated in the data base of the guidance system. Such parameters include those directed to the "balance" of the vehicle, i.e., weight, lengthwise center of gravity, righting moment, and static heel.

Traditionally, the weight of such a vehicle has been determined by suspending the vehicle by cable from a load cell. In view of the length and weight of such vehicles, it usually is the case that heavy equipment is required, such as a tall crane from which to suspend the load cell, and thereunder, the vehicle. Once suspended in place, the weight of the vehicle is indicated by the load cell.

To determine the length-wise center of gravity, it has been customary to loop a cable around the vehicle such that the vehicle is suspended and supported in a generally horizontal position by the loop. When the vehicle teeters downwardly toward either end, the position of the cable loop on the vehicle is adjusted toward that downwardly teetering end and through trial-and-error a cable position is attained at which the vehicle is suspended in an essentially horizontal position, the position of the cable on the vehicle indicating the lengthwise center of gravity of the vehicle. Again, suspending a vehicle, such as a torpedo, and raising and lowering the vehicle so as to adjust the position of the cable thereon, often a number of times before hitting upon the point at which the vehicle is suspended in length-wise equilibrium, requires heavy equipment, a crew of people, and space in which to maneuver the equipment and the vehicle.

In accordance with the prior art, righting moment is determined by suspending two endless cables from pulleys, respectively. In the lower bends of the cable is placed the vehicle, a first cable supporting a forward portion of the vehicle and a second cable supporting an after portion of the vehicle. The vehicle is then rotated 90° and a notation is made as to the force required to rotate the vehicle, the force being known as the "pull-around". The righting moment is then computed by multiplying the radius of the vehicle by the "pull-around".

Upon completion of the righting moment measurement, the vehicle is released from its turned position, whereupon the vehicle seeks return to its position of equilibrium. The difference in degrees between the equilibrium position of the vehicle and the designed upright position of the vehicle, that is, a selected position, is the static heel of the vehicle. Given the size and weight of torpedoes, and the like, righting moment and static heel measurements have traditionally required heavy equipment, a crew of substantial numbers, and space in which to operate the heavy equipment and the large crew.

Accordingly, it would be most beneficial to have a device and methods capable of effecting the above-described measurements under essentially laboratory conditions, such that continuing use of cranes and other heavy-equipment, large crews, and expansive space is not required and trial and error steps are obviated.

SUMMARY OF THE INVENTION

It is, therefore, an object of the invention to provide an apparatus and methods for determining the weight and lengthwise center of gravity of a generally cylindrical vehicle, the apparatus having facility for performing such determinations with the vehicle in substantially horizontal position on the apparatus.

A further object of the invention is to provide apparatus and methods for determining the righting moment and static heel of a generally cylindrical vehicle, the apparatus having facility for performing such determinations with the vehicle in substantially horizontal position on the apparatus, the apparatus having means for supporting the vehicle for rotation of the vehicle about its axis while on the apparatus to facilitate such determinations.

A still further object of the invention is to provide a single apparatus for determining all of the aforesaid parameters, i.e., the weight, lengthwise center of gravity, righting moment, and static heel of a generally cylindrical vehicle.

With the above and other objects in view, as will hereinafter appear, a feature of the present invention is the provision of apparatus for determining balance of a cylindrical vehicle, the apparatus comprising a frame adapted for horizontal disposition, first and second support assemblies mounted on the frame for receiving the vehicle, the first and second support assemblies including, respectively, first and second load cells, whereby upon placement of the vehicle on the first and second support assemblies with the first and second load cells each a selected distance from a forward end of the vehicle, the load cells ar adapted to provide readings indicative of the weight of the vehicle, from which may be determined the lengthwise center of gravity of the vehicle.

In accordance with another feature of the invention, there is provided apparatus for determining balance of a cylindrical vehicle, the apparatus comprising a frame adapted for horizontal disposition, first and second support assemblies mounted on the frame for receiving the vehicle, the support assemblies being adapted to support the vehicle for rotation thereon about the axis of the vehicle, a torsion load cell assembly mounted on the frame, first locking means on the torsion load cell assembly for attachment to the vehicle, turning tool receiving means on the torsion load cell assembly for engagement by a tool by which portions of the torsion load cell assembly, including the first locking means, and thereby the vehicle, may be turned, second locking means for holding the torsion load cell assembly and the vehicle at a selected turned position, and torque sensor means in the torsion load cell assembly for providing an indication of the force required to turn the vehicle to the selected position, from which may be determined the righting moment of the vehicle.

In accordance with a further feature of the invention, in the apparatus as described immediately above, the vehicle seeks to return to an upright position and therefore includes a biasing means such that upon turning of the torsion load cell assembly a bias generated by the vehicle biasing means urges return of the vehicle, and thereby the torsion load cell assembly, to a position of equilibrium, and upon release of the second locking means the vehicle and the torsion cell assembly move in response to the bias to the position of equilibrium. The torsion load cell assembly further includes indicator means for display of degrees difference between the position of equilibrium and a selected ideal upright position, to provide an indication of static heel of the vehicle.

In accordance with a still further feature of the invention, there is provided a single apparatus having all the above described features, such that the single apparatus provides readings indicative of, and/or facilitating ready computation of, weight, lengthwise center of gravity, righting moment, and static heel.

In accordance with still further features of the invention, there are provided methods for determining the weight, lengthwise center of gravity, righting moment, and static heel of a generally cylindrical vehicle.

The above and other features of the invention, including various novel details of construction and combination of parts, will now be more particularly described with reference to the accompanying drawings and pointed out in the claims. It will be understood that the particular device and methods embodying the invention are shown by way of illustration only and not as a limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIG. 5 is a side elevational view of a torsion load cell assembly portion of the apparatus;

FIG. 6 is a top plan view of the torsion load cell assembly of FIG. 5;

DESCRIPTION OF THE PREFERRED EMBODIMENTS

Figure 1:
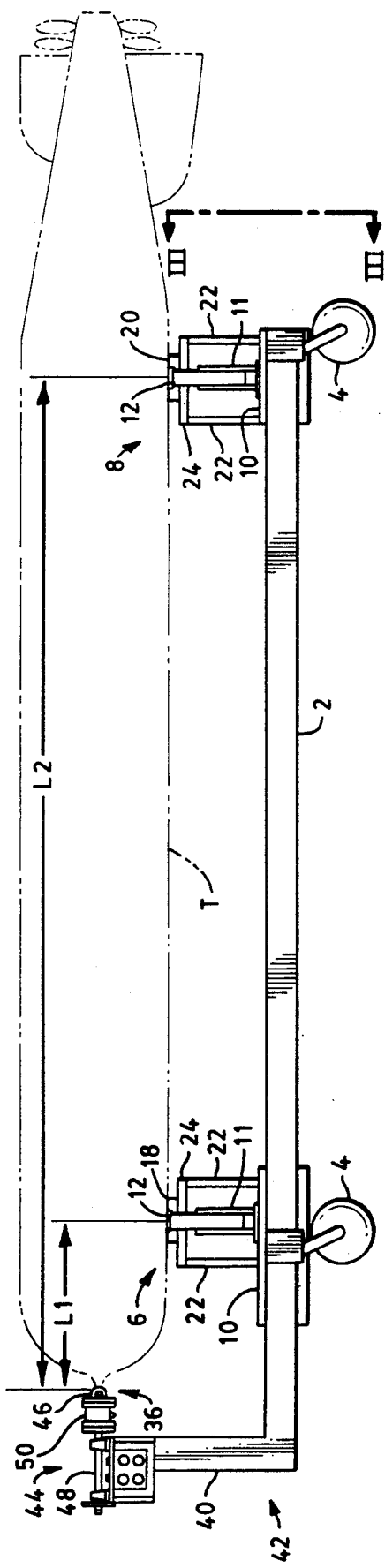
FIG. 1 is a side elevational view of one form of apparatus illustrative of an embodiment of the invention.
Figure 2:
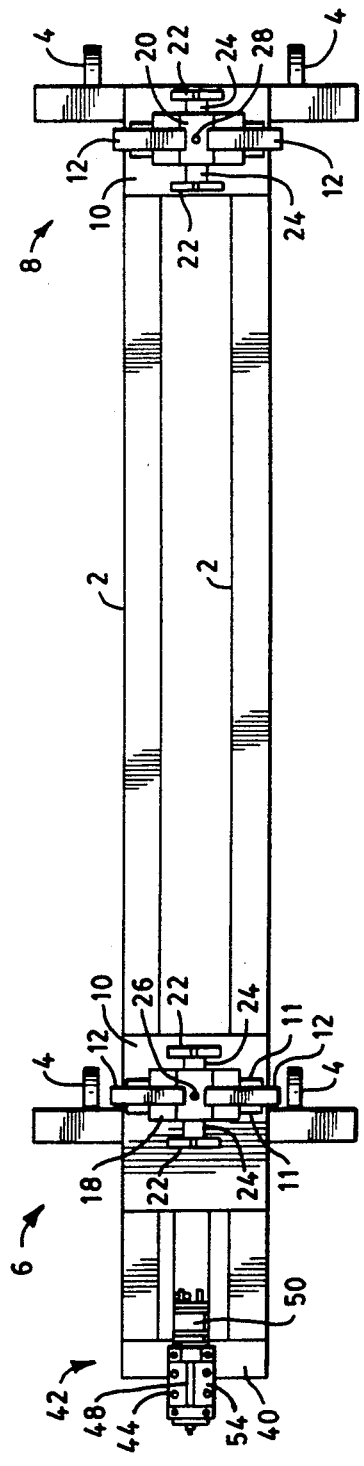
FIG. 2 is a top plan view thereof.
Figure 3:
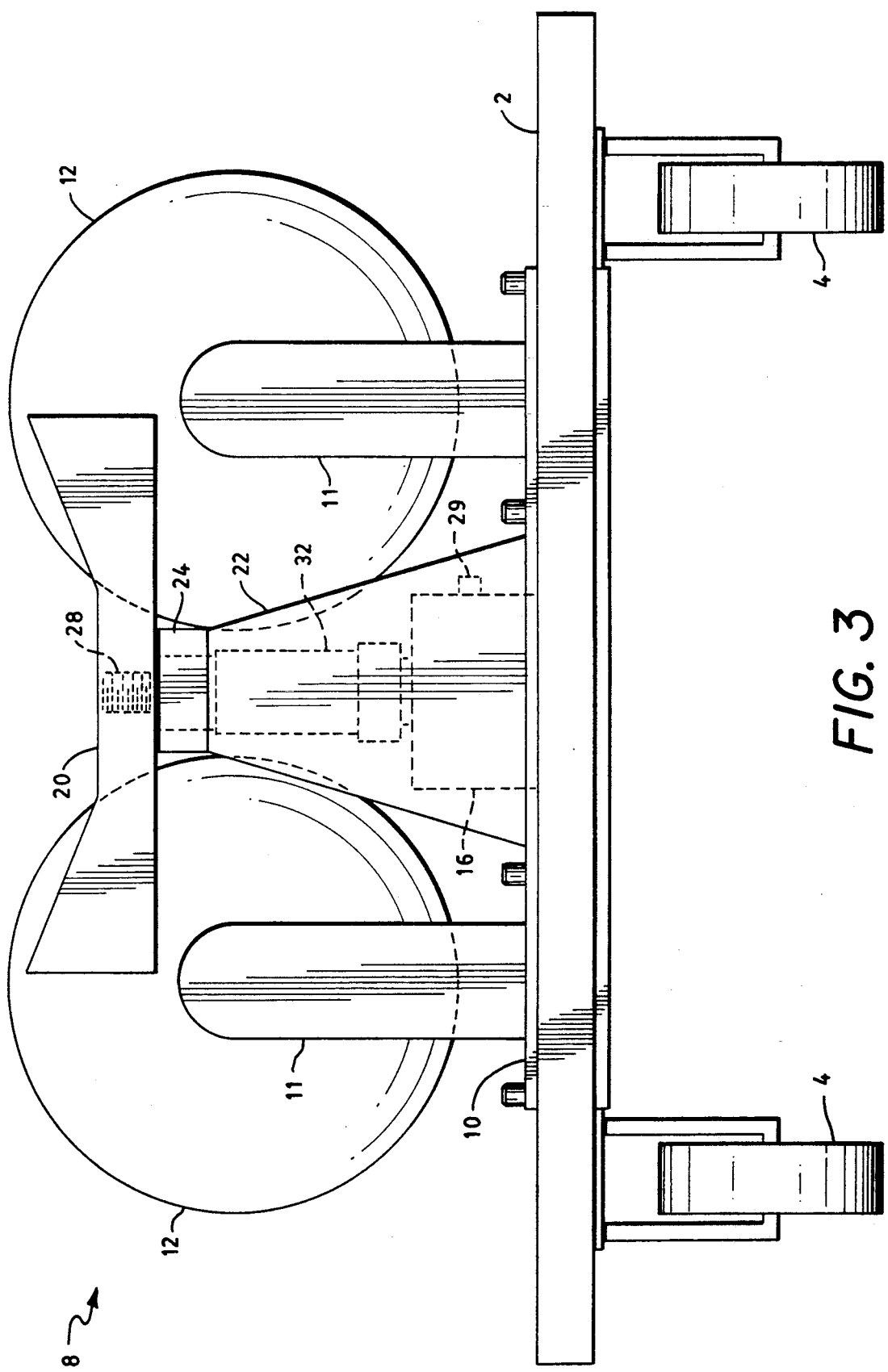
FIG. 3 is an enlarged end view thereof showing a support assembly portion of the apparatus.
Figure 4:
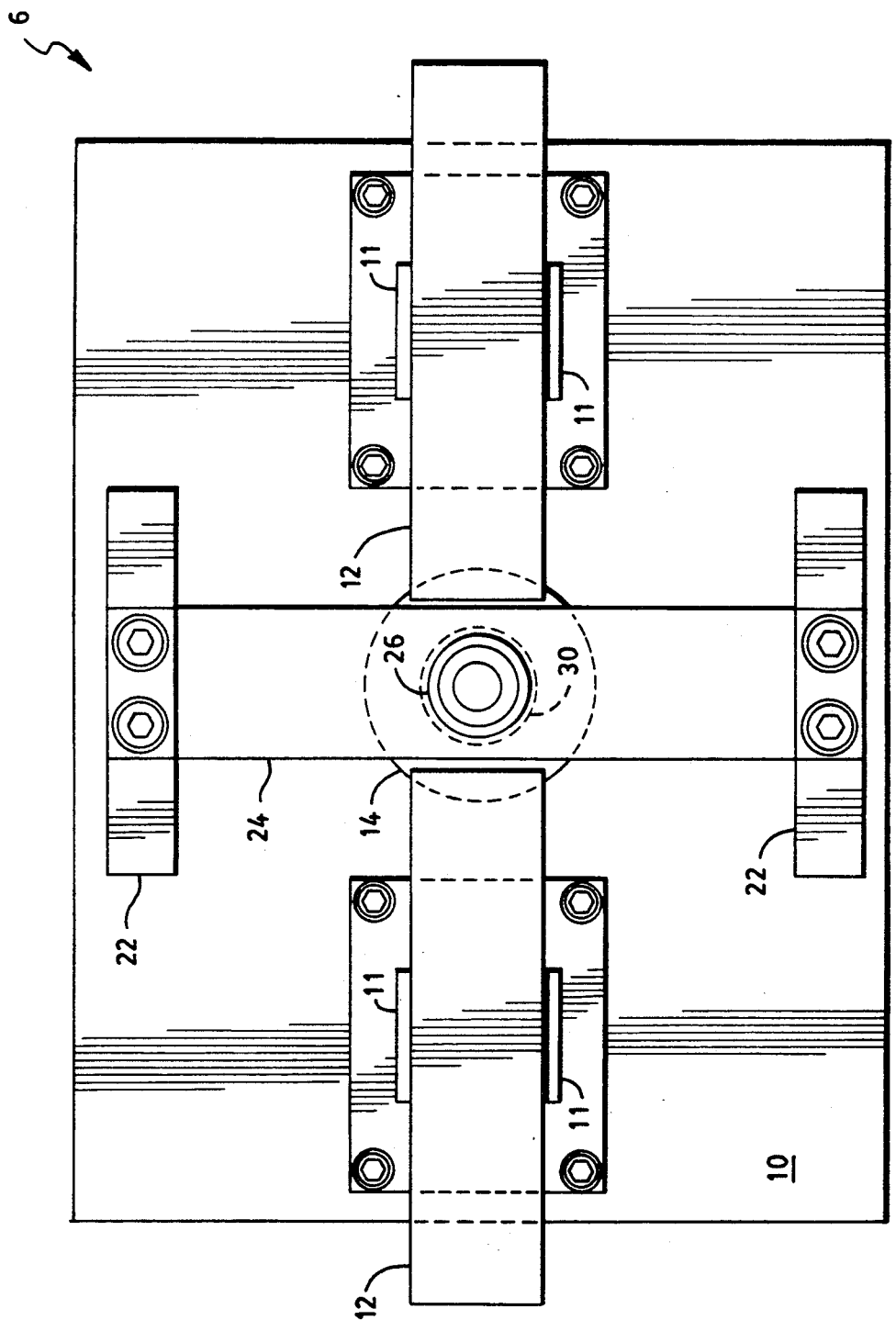
FIG. 4 is a top plan view of another support assembly similar to that shown in FIG. 3 with portions removed.

Referring to the drawings, particularly FIGS. 1-3, it will be seen that an illustrative embodiment of the invention includes a frame 2 adapted for horizontal disposition, as on wheels 4, to provide mobility. Upstanding from the frame 2 are first and second support assemblies 6, 8. Each of the support assemblies comprises a base plate 10 (FIGS. 1-4) with struts 11 upstanding therefrom on which are mounted a pair of rollers 12 which serve as receiving means for a generally cylindrical vehicle, such as a torpedo T (FIG. 1).

Each of the support assemblies 6, 8, is provided with a load cell 14, 16 (FIGS. 4 and 3, respectively) on which is mounted a cradle 18, 20 (FIGS. 1, 2 and 3) which is adapted to be raised to lift the vehicle from the receiving means and support the vehicle T for weighing thereof. Each of the load cells 14, 16 is housed between vertical supports 22 and covered by a plate 24 fixed to upper ends of the vertical supports 22. The cradles 18, 20 are, respectively, mounted on shafts 26, 28 connected via hydraulic jacks 30, 32 to the load cells 14, 16, respectively. The cradles 18, 20 at rest are in a retracted position, as shown in FIG. 3, in which the cradles are below the upper surfaces of the rollers 12. After the rollers 12 have received the vehicle and it is desired to ascertain the pertinent guidance parameters of the vehicle, the jacks 30, 32 are energized to raise the cradles 18, 20 to the positions shown in FIG. 1, in which the cradles are disposed slightly above the rollers 12 to assume the full weight of the vehicle thereon. Each of the support assemblies 6, 8 is provided with a means for transmitting a signal, as from an electrical connector 29 (FIG. 3), indicative of weight sensed, to a central station and/or computer in a selected computer language for readout and/or printout in desired manner and mode.

In operation, a vehicle is lowered onto the assembly, with a forward portion of the vehicle received by the receiving portion of the first support assembly 6 and an after portion of the vehicle received by the receiving portion of the second support assembly 8. The hydraulic jacks 30, 32 are activated to raise the cradles 18, 20 to remove the vehicle from contact with the rollers 12, placing the weight of the vehicle on the cradles 18, 20 and thereby the load cells 14, 16. The load cells 14, 16 associated with the respective support assemblies 6, 8, provide an indication of the weight sensed by each load cell. The two indications of weight are added together to provide an indication as to the total weight.

In assembling of the above-described apparatus, the first load cell 14 in the first support assembly 6 is a known distance L1 from a fixed point 36 (FIG. 1) on the apparatus. Similarly, the second load cell 16 in the second support assembly 8 is a known distance L2 from the fixed point 36. In placing the vehicle on the assembly, an end of the vehicle, typically the forward end of the vehicle, is placed at the point 36, such that L1 equals the distance of the first load cell from the forward end of the vehicle and L2 equals the distance of the second load cell from the forward end of the vehicle. Designating the weight sensed by the first load cell as F1 and the weight sensed by the second load cell as F2, the center of gravity of the vehicle is determined by computation in accordance with the formula, in which the center of gravity is designated CG:

$$CG = \frac{(F1)(L1) + (F2)(L2)}{F1 + F2}$$

The center of gravity is thereby determined in linear units from the forward end of the vehicle.

In instances in which the readout of the load cells is transmitted to a computer, an indication as to the center of gravity may be provided virtually instantly, along with the weight of the vehicle.

Referring particularly to FIGS. 2 and 3, it will be seen that in each of the support assemblies 6, 8 the axes of the rollers 12 are parallel to the axis of the vehicle when the vehicle is disposed on the rollers. The rollers 12 are adapted to rotate freely about their axes, which are of equal distance from the base plate 10. The rollers are in side by side alignment and are adapted to receive the vehicle such that a forward portion of the vehicle is received by rollers of the first support assembly 6 and an after part of the vehicle is received by the rollers of the second support assembly 8.

The apparatus is further provided with mounting means 40 (FIG. 1) upstanding from the frame 2 at or near a first end 42 of the frame. A torsion load cell assembly 44 is mounted on the mounting means 40 and includes a first locking means 46 (FIGS. 5 and 6) adapted for fixing a forward end of the vehicle to the torsion load cell assembly. The assembly first locking means 46 establishes the aforementioned fixed point 36, the point at which is disposed the forward end of the vehicle in a parameter measuring operation. The first locking means 46 is fixed to a rotatable shaft 48 connected to, and in operative engagement with, a torque sensor 50. The shaft 48 is supported by blocks 52 upstanding from a base plate 54.

At a free end 56 of the shaft 48, the shaft is provided with turning tool receiving means 58 for engagement with a tool (not shown) by which the shaft 48 and first locking means 46 may be turned, thereby effecting turning of the vehicle on the rollers 12.

In operation, with the vehicle disposed on the rollers 12, a tool is applied to the turning tool receiving means 58 and the shaft 48, locking means 46, and thereby the vehicle, are turned from a position in which the vehicle is at rest at a designed upright position through a 90°, or other selected degrees, angle. The torsion load cell torque sensor 50 provides a readout by way of an electrical connector 59 (FIG. 5), which readout may be an electrical signal to a computer and/or central station. In the selected mode, the torque sensor provides an indication of the force required to turn the vehicle through the selected number of degrees, that is, the "pull-around". To obtain the righting moment, the "pull-around" is multiplied by the radius of the vehicle, which may be done virtually instantly by a computer.

Figure 7:
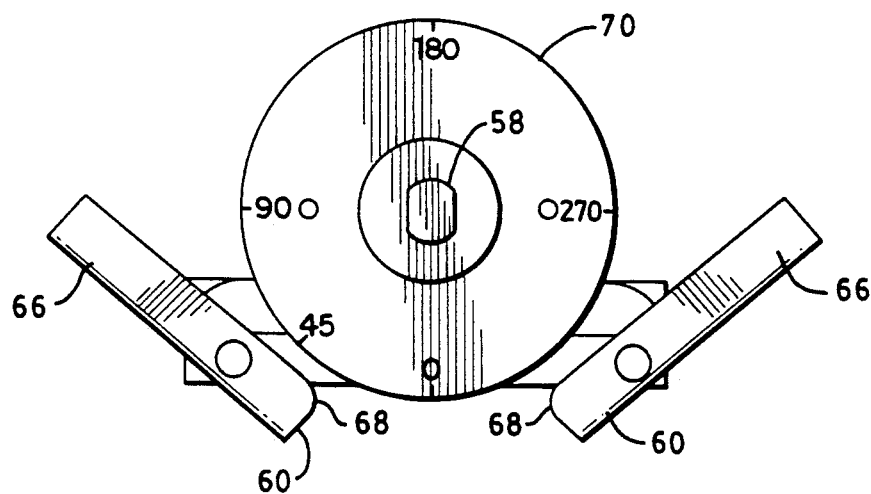
FIG. 7 is an elevational view of a locking means portion of the assembly of FIG. 6.
Figure 8:
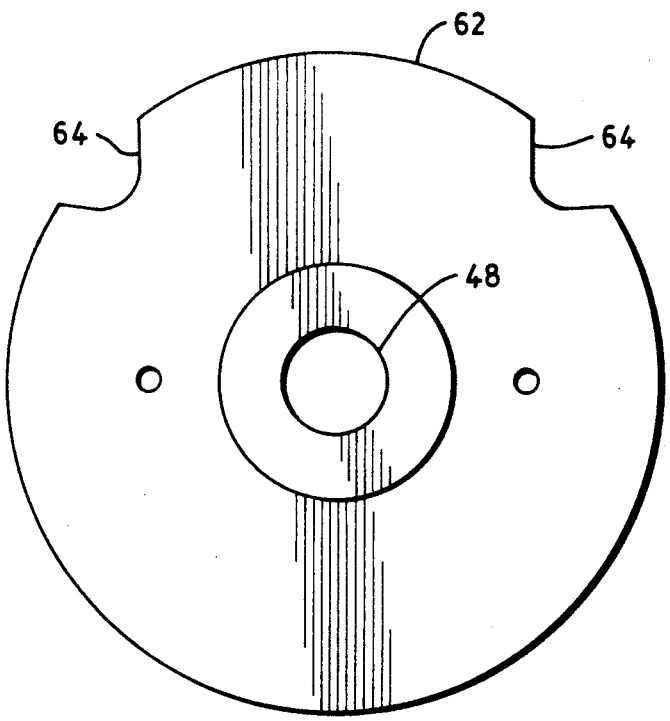
FIG. 8 is an elevational view of another locking means portion of the assembly of FIG. 6.

The torsion load cell assembly is provided with a second locking means 60 which includes a lockplate 62 (FIGS. 5, 6 and 8) mounted on the shaft 48 and having notches 64 (FIGS. 5, 6 and 8) in the periphery thereof. The assembly has disposed thereon pivotally mounted levers 66 (FIG. 7) having ends 68 shaped complementarily to the notches 64 in the lockplate 62. The lockplate 62 may have attached thereto an engraved dial 70 by which an operator can observe the degrees turned. The notches 64 are disposed on the lockplate 62 so as to lock the lockplate 62, and thereby the vehicle, in a 90°, or other selected, turned position.

As the vehicle is turned, there is developed in the vehicle a biasing force, engendered by the vehicle having a propensity to return to a generally upright position of equilibrium. Accordingly, the turned vehicle generates a bias which urges movement of the vehicle, and thereby the torsion load cell assembly, to the position of equilibrium.

To obtain the static heel of the vehicle, the second locking means 60 is released, permitting the vehicle to rotate of its own accord in response to the bias force generated therein, to the position of equilibrium. It is usually the case that a given vehicle will seek a position somewhat removed from the designed ideal upright position of the vehicle. The torsion load cell assembly is provided with mean for indicating the degrees difference between the designed ideal upright position of the vehicle and the position of equilibrium attained by the vehicle of its own accord, thereby providing an indication of static heel. The indicator means may comprise the dial 70, or other visual indication, or may, in addition thereto or in place thereof, comprise a signal device adapted to transmit a static heel signal to a computer and/or central station.

There is thus provided an apparatus which may be adapted to provide weight and lengthwise center of gravity of a cylindrical vehicle under laboratory or test room conditions. The apparatus may be provided, in addition to the weight and center of gravity determination means, or alternatively thereto, with means for determining righting moment and static heel under laboratory or test room conditions. There is still further provided methods for determining the weight, lengthwise center of gravity, righting moment, and static heel of a cylindrical vehicle, without the traditional use of cranes and handling crews.

It will be understood that many additional changes in the details, materials, steps and arrangement of parts, which have been herein described and illustrated in order to explain the nature of the invention, may be used by those skilled in the art within the principles and scope of the invention as expressed in the appended claims.

What is claimed is:

1. Apparatus for determining balance of a cylindrical vehicle, said apparatus comprising a frame oriented in a horizontal disposition, first and second cradles mounted on said frame and moveable vertically for engaging and for supporting said vehicle, said first and second cradles being connected to and extending from, respectively, first and second load cells on said frame, whereby upon vertical movement of said cradles with engagement and support of said vehicle by said first and second cradles, with said first and second load cells each a selected distance from a forward end of said vehicle, said load-cells are adapted to provide readings indicative of the weight of said vehicle from which may be determined the lengthwise center of gravity of said vehicle.

2. The apparatus in accordance with claim 1 wherein said first cradle and said first load cell are disposed in a first support assembly, said second cradle and said second load cell are disposed in a second support assembly, said first support assembly upstands from said frame proximate and removed from a first end of said frame, and said second support assembly upstands from said frame further removed from said first end of said frame.

3. The apparatus in accordance with claim 2 wherein said first and second support assemblies are respectively provided with first and second receiving means, said first receiving means being adapted to receive a forward portion of said vehicle and said second receiving means being adapted to receive an after portion of said vehicle and wherein said cradles are adapted to be moved to and retained in a position below said receiving means whereby said receiving means supports said vehicle, and are adapted to be moved to and retained in a second position elevated above said receiving means whereby said cradles are adapted to lift said vehicle off said receiving means for supporting said vehicle independently of said receiving means.

4. The apparatus in accordance with claim 3 wherein each of said receiving means comprises rollers adapted to receive said vehicle, axes of said rollers being parallel to the axis of said vehicle when said vehicle is disposed on said rollers.

5. The apparatus in accordance with claim 3 wherein each of said receiving mean comprises first and second rollers adapted for rotation about parallel axes of equal distance from said frame, said first and second rollers being in side by side alignment and adapted to receive said vehicle such that said forward portion of said vehicle is disposed on said first and second rollers of said first receiving means and said after portion of said vehicle is disposed on said first and second rollers of said second receiving means.

6. The apparatus in accordance with claim 4 wherein said apparatus further comprises mounting means upstanding from said frame closer to said first end of said frame than said first support assembly, a torsion load cell assembly mounted on said mounting means, said torsion load cell assembly comprising first locking means for fixing said forward end of said vehicle to said torsion load cell assembly, turning tool receiving means for engagement with a tool by which portions of said torsion load cell assembly, including said first locking means, and thereby said vehicle fixed thereto, may be turned, second locking means for locking said vehicle at a selected turned position, and torque sensor means in said assembly for providing an indication of the force required to turn said vehicle to said selected position, from which may be determined the righting moment of said vehicle.

7. The apparatus in accordance with claim 6 wherein said torsion load cell assembly is subject to a biasing force engendered by said vehicle having a propensity to return to a generally upright position, such that upon turning of said torsion load cell assembly said biasing force urges movement of said vehicle, and thereby said torsion load cell assembly, to a position of equilibrium, and upon release of said second locking means, said vehicle and said torsion load cell assembly move in response to said bias to said position of equilibrium, indicator means for display of degrees difference between said position of equilibrium and a selected ideal upright position, whereby to provide an indication of static heel of said vehicle.

8. Apparatus for determining balance of a cylindrical vehicle, said apparatus comprising a frame adapted for horizontal disposition, first and second support assemblies mounted on said frame for receiving said vehicle, said support assemblies being adapted to support said vehicle for rotation thereon about the axis of said vehicle, a torsion load cell assembly mounted on said frame, first locking means on said load cell assembly for attachment to said vehicle, turning tool receiving means on said load cell assembly for engagement by a tool by which portions of said load cell assembly, including said first locking means, and thereby said vehicle, may be turned, second locking means for holding said load cell assembly and said vehicle at a selected turned position, and torque sensor means in said load cell assembly for providing an indication of the force required to turn said vehicle to said selected position, from which may be determined the righting moment of said vehicle.

9. The apparatus in accordance with claim 8 wherein said first support assembly upstands from said frame proximate and removed from a first end of the frame, and said second support assembly upstands from said frame further removed from said first end of said frame.

10. The apparatus in accordance with claim 9 wherein said first and second support assemblies are respectively provided with first and second receiving means, said first receiving means being adapted to receive a forward portion of said vehicle and said second receiving means being adapted to receive an after portion of said vehicle.

11. The apparatus in accordance with claim 10 wherein each of said receiving means comprises rollers adapted to receive said vehicle, axes of said rollers being parallel to the axis of said vehicle when said vehicle is disposed on said rollers.

12. The apparatus in accordance with claim 11 wherein said rollers of each of said receiving means comprise first and second rollers, said axes of said rollers being of equal distance from said frame, said first and second rollers being in side by side alignment.

13. The apparatus in accordance with claim 10 wherein said torsion load cell assembly is subject to a biasing means engendered by said vehicle seeking return to its upright position of equilibrium, such that upon turning of said torsion load cell assembly a force generated by said biasing means urges return of said vehicle, and thereby said torsion load cell assembly, to a position of equilibrium, and upon release of said second locking means said vehicle and said torsion cell assembly move in response to said bias to said position of equilibrium.

14. The apparatus in accordance with claim 13 and further comprising indicator means for display of degrees of difference between said position of equilibrium and a selected position, whereby to provide an indication of static heel of said vehicle.

15. Apparatus for determining balance of a cylindrical vehicle, said apparatus comprising a frame adapted for horizontal disposition, a first support assembly upstanding from said frame proximate and removed from a first end of said frame, a second support assembly upstanding from said frame proximate a second end of said frame, each of said first and second support assemblies including first and second rollers, said first and second rollers being adapted for rotation about parallel axes of equal distance from said frame, said first and second rollers being in side by side alignment, and a torsion load cell assembly mounted on said frame, said torsion load cell assembly comprising means for fixing a forward end of said vehicle to said torsion load cell assembly, turning tool receiving means by which portions of said torsion load cell assembly and said vehicle fixed thereto may be turned on said rollers, locking means for locking said vehicle at a selected turned position, and torque sensor means for providing an indication of force required to turn said vehicle, from which may be determined the righting moment of said vehicle.

16. Apparatus for determining balance of a cylindrical vehicle, said apparatus comprising a frame adapted for horizontal disposition, a first support assembly upstanding from said frame proximate and removed from a first end of said frame, a second support assembly upstanding from said frame further removed from said first end of said frame than said first support assembly, each of said support assemblies including roller means for supporting a vehicle and permitting rotation of said vehicle thereon, turning means for rotating said vehicle on said roller means for determining righting moment and static heel, and each of said support assemblies including cradle means movable from a first position removed from said vehicle to a second position in which said cradle means support said vehicle removed from and raised over said rollers for determining weight and lengthwise center of gravity of said vehicle.

17. The apparatus in accordance with claim 16 wherein said apparatus further comprises turning tool receiving means mounted on said frame to facilitate turning of said vehicle on said rollers.

18. A method for determining weight of a generally cylindrical vehicle, said method comprising providing a substantially horizontal frame, mounting first and second cradles on said frame, mounting first and second receiving means on said frame for receiving said vehicle, providing said first and second cradles, respectively, with first and second load cells adapted to indicate weight placed upon the respective cradles, moving said cradles from positions beneath the level of the receiving means into vehicle supporting positions above the level of said receiving means, to remove the vehicle from the receiving means, and adding the weight indications of said first and second cradles.

19. A method for determining weight and lengthwise center of gravity of a generally cylindrical vehicle, said method comprising providing a substantially horizontal frame, maintaining said frame in a fixed horizontal disposition, fixing first and second load cells on said frame, providing first and second cradles, respectively, extending from said first and second load cells, providing means on said frame for receiving said vehicle, moving said cradles to lift said vehicle off said receiving means, said load cells being adapted to indicate weight supported by the respective cradles, determining the distance of said first load cell from an end of said vehicle, determining the distance of said second load cell from said end of said vehicle, and by using the weight indication of said first load cell and the distance of said first load cell from said end of said vehicle, and the weight indication of said second load cell and the distance of said second load cell from said end of said vehicle, computing the lengthwise position of said center of gravity of said vehicle in terms of distance from said end of said vehicle.

20. A method for determining righting moment of a generally cylindrical vehicle, said method comprising providing a substantially horizontal frame, mounting first and second support assemblies on said frame, providing said support assemblies with roller means for receiving said vehicle and facilitating turning of said vehicle about its axis on said roller means, mounting a torsion load cell assembly on said frame, providing first locking means on said assembly and therewith locking said assembly to an end of said vehicle, providing turning tool receiving means on said assembly, applying a turning tool to said turning tool receiving means to turn portions of said assembly and said vehicle through a selected number of degrees, and providing indicating means on said assembly for indicating the force required for said turn of said vehicle, determining the radius of said vehicle, and multiplying said radius by said force to obtain said righting moment.

21. The method for determining righting moment in accordance with claim 20 and further including providing a second locking means for holding said assembly and said vehicle in its turned position.

22. A method for determining static heel of a generally cylindrical vehicle, said method comprising providing a substantially horizontal frame, mounting first and second support assemblies on said frame, providing said support assemblies with roller means for receiving said vehicle and facilitating turning of said vehicle about its axis, mounting a vehicle turning means on said frame and connecting said turning means to said vehicle, operating said turning means to rotate said vehicle a selected number of degrees from an ideal upright position, holding said vehicle in its rotated position and releasing said vehicle such that said vehicle seeks a position of equilibrium and of its own accord turns to said position of equilibrium, and providing means for indicating the degrees difference between said ideal upright position and said position of equilibrium, thereby to provide an indication of static heel.

* * * * *